United States Patent [19]

Kirpich

[11] Patent Number: 4,800,952
[45] Date of Patent: Jan. 31, 1989

[54] THAW FLOW CONTROL FOR LIQUID HEAT TRANSPORT SYSTEMS

[75] Inventor: Aaron S. Kirpich, Broomall, Pa.

[73] Assignee: General Electric Company, King of Prussia, Pa.

[21] Appl. No.: 76,465

[22] Filed: Jul. 22, 1987

[51] Int. Cl.$^4$ .............................................. F28D 15/00
[52] U.S. Cl. ........................ 165/104.11; 165/104.31; 165/104.17; 165/104.14; 165/41; 137/334; 137/339; 137/340; 376/214; 376/367
[58] Field of Search ...................... 165/104.26, 41, 142, 165/104.17, 104.11, 104.14, 104.31; 137/334, 339, 340; 237/1 SL; 376/214, 367

[56] References Cited

U.S. PATENT DOCUMENTS

| | | | |
|---|---|---|---|
| 1,295,687 | 2/1919 | Bullard | 137/339 |
| 3,537,515 | 11/1970 | Byrd | 165/104.14 |
| 3,688,800 | 9/1972 | Hayner et al. | |
| 4,086,958 | 5/1978 | Lindner et al. | 165/10 |
| 4,371,028 | 2/1983 | Helshoj | 165/10 |
| 4,671,348 | 6/1987 | Bauer | 165/104.26 |

OTHER PUBLICATIONS

"Elements and Concepts of the SP-100 Heat Rejection System", by Edward J. McNamara, pp. 24–28, published in the Fourth Symposium on Space Nuclear Power Systems, Trans. of the 1987 SP-100 Program Sessions, dated Jan. 15, 1987.

"Trade-offs and Studies of the SP-100 Systems Concept", by A. Kirpich et al., pp. 3–8, published in the Fourth Symposium on Space Nuclear Power Systems, Trans. of the 1987 SP-100 Program Sessions, dated Jan. 15, 1987.

"SP-100 Ground Engineering System Project", General Electric Company Proposal No. SP5086, dated Feb. 3, 1986.

Primary Examiner—Albert W. Davis, Jr.
Attorney, Agent, or Firm—Raymond E. Smiley

[57] ABSTRACT

In a liquid metal heat transport system including a source of thaw heat for use in a space reactor power system, the thaw flow throttle or control comprises a fluid passage having forward and reverse flow sections and a partition having a plurality of bleed holes therein to enable fluid flow between the forward and reverse sections. The flow throttle is positioned in the system relatively far from the source of thaw heat.

16 Claims, 4 Drawing Sheets

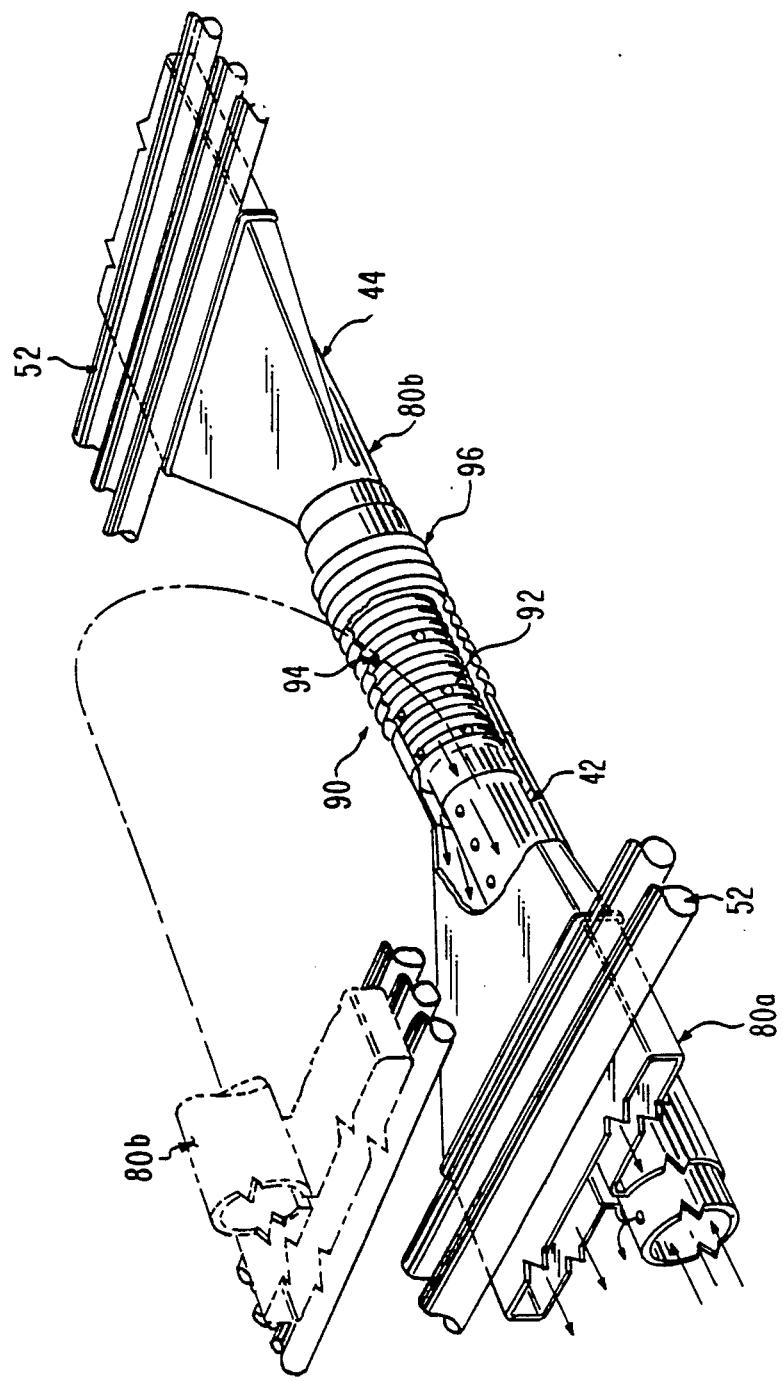

THAW FLOW CONTROL FOR LIQUID HEAT TRANSPORT SYSTEMS

BACKGROUND OF THE INVENTION

The invention relates to liquid heat transport systems for use in space reactor power systems and more particularly to means for gradually increasing the rate of fluid flow resulting from thawing the liquid-metal in a heat transport system for use in space reactor power systems.

Liquid metals are used as circulants in space reactor power systems both for primary heat transport and for waste heat removal. Many desirable coolants are in a frozen state at original startup and require a means to thaw the coolants before flow circulation can be established. Lithium is a prime example of a coolant material of this type. In current space reactor power system designs, liquid lithium is used to transport heat from the reactor at approximately 1100° C. and to remove waste heat from energy conversion units at 500° C. Lithium, however, has a melting temperature of 180° C. and requires a means of thaw before full flow circulation can be attained.

Certain liquid metals, such as the eutectic combination of sodium and potassium (NaK), are molten at low temperatures and would obviate the need for thaw. However, available eutectic combinations are heavy and require considerable pumping power for effective circulation. A further consideration relates to the safety hazards of launching into space systems with the circulants in a molten state. The possibility of launch-induced leaks would impose a serious hazard to both crew (in the case of a shuttle launch) and equipment. The use of lithium circulant precludes this possibility because it would remain frozen during the entire launch phase. For those performance and safety reasons, lithium is the preferred circulant in many high-performance systems.

U.S. Pat. No. 3,537,515 discloses a circulatory cooling system utilizing liquid-metal coolant lines which are heated by a series of heat pipes butted end-to-end and extending through the center of the lines. The heat pipes derive their heat directly from the waste heat of the heat source.

In certain implementations the reactor is a source of heat that activates fluid circulation pumps by thermoelectric means. Thus, during the thaw process, the pumps will develop pumping head although no circulation is possible until full thaw is achieved with the removal of blockage by frozen material. With relatively high reactor temperatures required to deliver heat during the thaw process, full thaw may be accompanied by a sudden flow as the final blockage is removed, giving rise to two significant problems: (1) the hot flow to the power conversion system may result in severe thermal gradients with high potential for thermal shock; and (2) the relatively cool return flow from the power conversion system to the reactor may result in large changes in reactivity with consequent reactor control instabilities.

It is possible to minimize these effects by modulating the pumping action either electrically or mechanically. These methods, however, introduce complexity and defeat the benefits of the essentially passive nature of thermoelectrically-driven pumps.

SUMMARY OF THE INVENTION

The invention in its broad aspects discloses a novel thaw flow control comprising a fluid passage having forward and reverse flow sections. The forward an reverse flow sections are separated by a partition. The partition has bleed holes which enable fluid flow between the forward and reverse flow sections. Gradual flow modulation s achieved by the rate at which the thaw front proceeds along the partition. Flow increases as more and more bleed holes are thawed. The thaw flow control may be situated remotely from the source of thaw heat (usually the reactor) to insure that it is the last part of the heat transport system to be thawed.

BRIEF DESCRIPTION OF THE DRAWINGS

In the drawing:

FIG. 5 is a perspective view of a flexible duct section useful with the embodiment of FIG. 4.

DETAILED DESCRIPTION OF THE INVENTION

Figure 1:
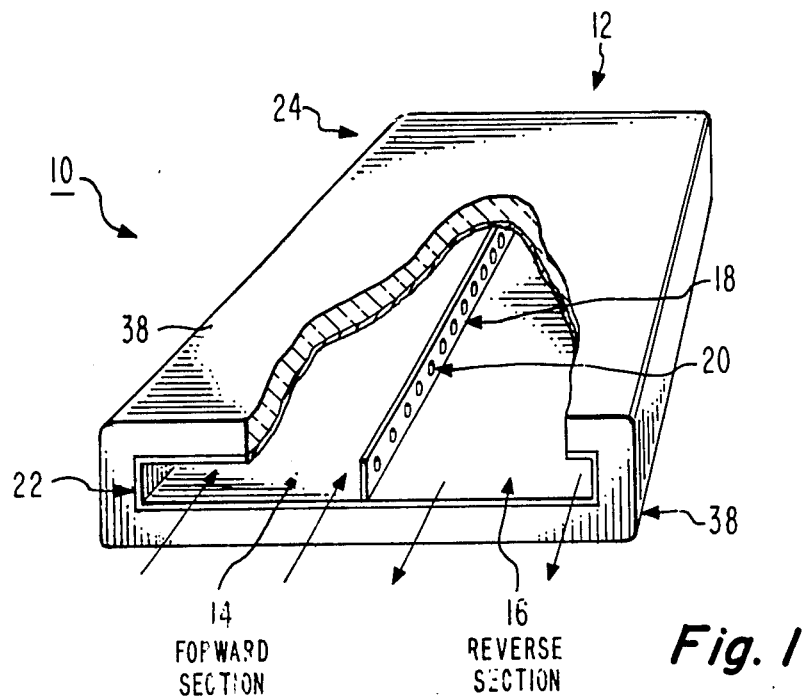
FIG. 1 is a perspective view of the invention with a portion of one side removed to expose the inner detail.

Referring now to FIG. 1, there is shown a thaw flow throttle 10. Thaw flow throttle 10 includes a fluid passage 12 comprising a forward flow section 14, a reverse flow section 16, and a partition 18 separating forward flow section 14 and reverse flow section 16. Partition 18 has a plurality of bleed holes 20 spaced along its length. Bleed holes 20 divert fluid flow from forward flow section 14 to reverse flow section 16. Suitable materials from which to construct thaw flow restrictor throttle 10 include, for example, stainless steel, titanium, and various refractory metals.

Figure 2:
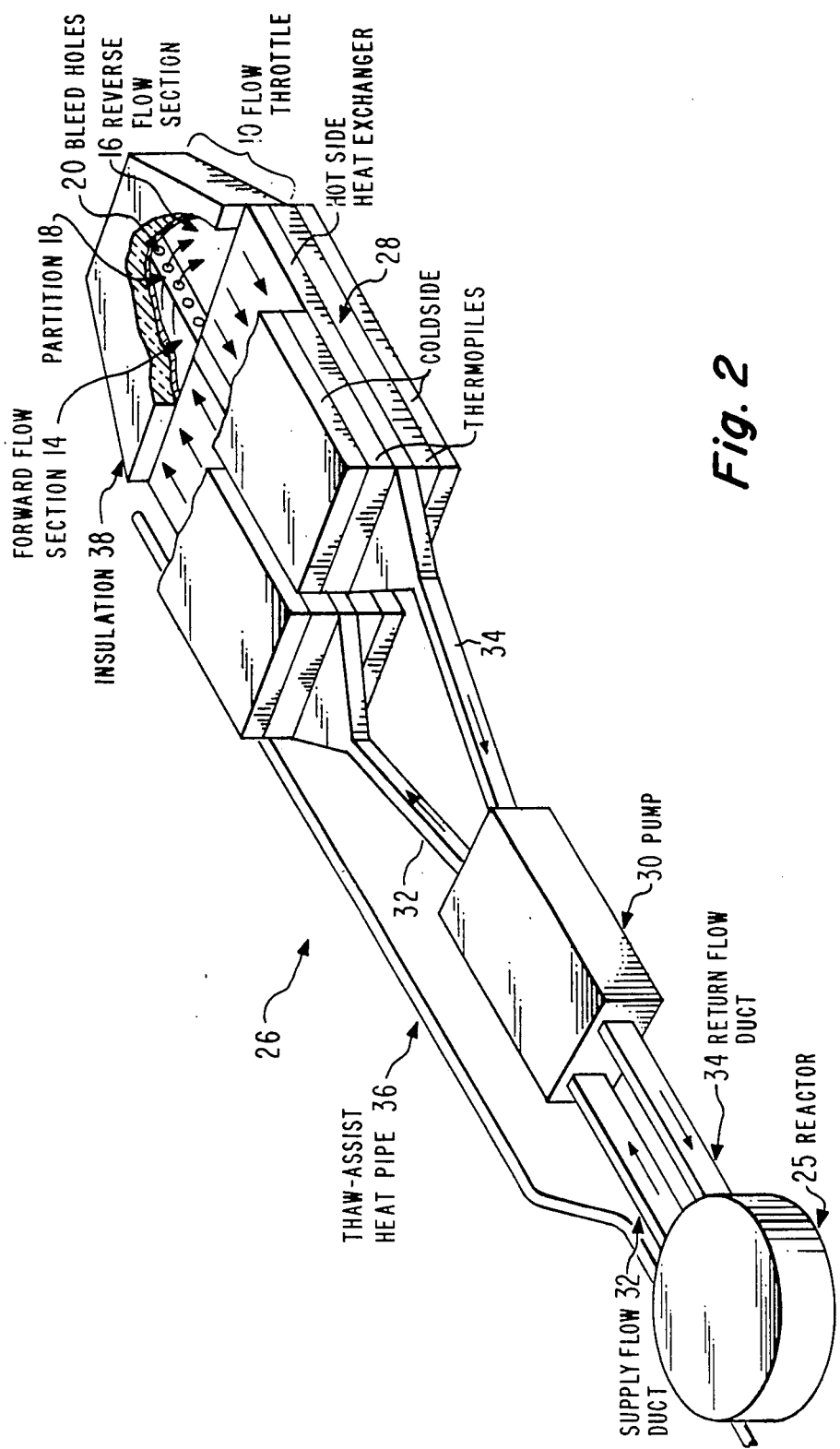
FIG. 2 shows the invention intergrated into a typical heat transport system for a space reactor power system.

Referring to FIG. 2, thaw flow throttle 10 is shown integrated into a simplified heat transport system 26 similar to the type used in space reactor power systems. Heat transport system 26 comprises thaw flow throttle 10, a nuclear reactor 25, a heat exchanger 28, a pump 30, a supply flow duct 32, a return flow duct 34, and a thaw-assist heat system 36. Heat transport system 26 circulates a liquid metal, such as lithium, to transport heat from the reactor 25 to heat exchanger 28. The fluid (or coolant) circulated in coolant system 26 can be a variety of liquids but is typically a liquid such as lithium. Liquid metals are the preferred coolants because of their high temperature stability as compared to other possible coolants. Heat exchanger 28 is further connected to a power conversion system for converting thermal energy to electrical energy. Thaw-assist heat system 36 may consist of a series of heat pipes which distribute heat from the reactor to all the elements of heat transport system 26 except thaw flow throttle 10 for thawing frozen metal. The heat pipes of the thaw-assist system 36 are positioned along and near the ducts, the pump, and the heat exchanger to radiate heat, and at the opposite end are conductively bonded to the reactor vessel. Pump 30 circulates return flow liquid metal via duct 34 past the reactor where it is heated. Supply flow duct 32 then returns, the liquid metal to pump 30 where further pumping carries it to heat exchanger 28. There, its thermal energy is converted to electrical energy cooling the liquid metal in the process. Next, the liquid metal enters forward flow section 14 of flow restrictor throttle 10. Bleed holes 20 in partition 18 divert the flow into reverse flow section 16. Leaving thaw flow throttle 10, the liquid metal reenters heat exchanger 28 where more thermal energy is converted. The now cooled liquid metal then returns to pump 30, and the loop is repeated. Since no fluid can circulate until a complete loop of metal coolant is thawed, the thaw flow throttle 10 is perferably closed to the last section of heat transport system 26 to be thawed. Thus, it is necessary to insure that thaw flow restrictor throttle 10 is the last section thawed. This is accomplished by locating thaw flow restrictor throttle 10 at the end of heat transport system 26 farthest from the reactor. To further insure this condition, thermal insulation 38 may be affixed to the outer surface of thaw flow restrictor throttle 10. Thermal insulation 38 prevents premature thawing of thaw flow restrictor 10 due to heat by thaw-assist heat system 36 .

Operation of thaw flow restrictor 10 will be described with reference to FIGS. 2 and 3. Assume that the liquid metal is lithium; also assume that the reactor 25 and heat transport system 26 have been inactive for an extended period of time allowing the lithium to freeze. This is the case at original startup after a spacecraft first achieves orbit or restart after a coast period or shutdown for maintenance. Spacecraft startup or restart begins by raising the temperature of the reactor above the melting temperature of lithium (180° C.). The lithium in heat transport system 26 closest to the reactor 25 begins to melt establishing a thaw front, i.e., the interface between the lithium in its solid and liquid states. The thaw front advances forward a limited distance by conduction. Using the heat of the reactor, thaw-assist heat system 36 advances the thaw front up to the entry plane of thaw flow restrictor throttle 10 but does not directly thaw it. Because of thermal conduction with the lithium, the thaw front will advance past the first bleed hole in partition 18. Next, a slight flow is established through the thawed bleed hole by pump 30 which gradually interchanges the hot molten lithium near the reactor with the relatively cool molten lithium in thaw flow restrictor 10. Since the initial flow can only circulate through one bleed hole in partition 18, the flow is highly restricted at this point and the exchange occurs without the abruptness of a sudden thaw.

Figure 3:
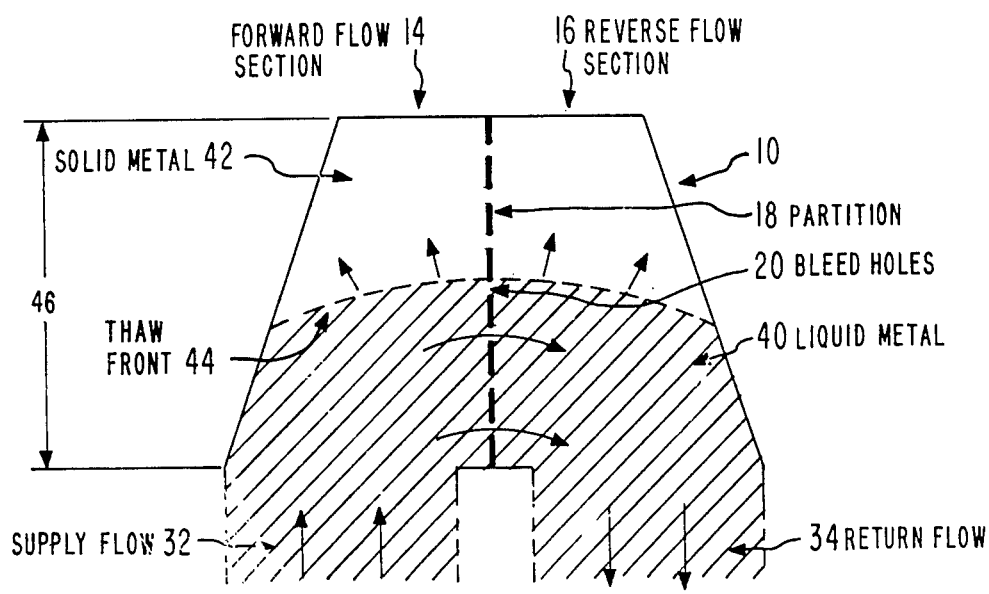
FIG. 3 is an illustrative view of the invention as shown in FIG. 2 with an entire side removed to depict progression of the thaw front.

The advancement of the thaw front inside thaw flow restrictor 10 is depicted in FIG. 3. The convectively flowing hot, liquid lithium 40 from near the reactor meets with cooler, solid lithium 42 in thaw flow restrictor throttle 10 resulting in the gradual advancement of thaw front 44 as more and more uncovered bleed holes 20 permit increased flow. In this way, thaw front 44 will proceed along the entire length of thaw flow restrictor 10 until all the lithium is melted.

Thaw flow control results from the gradual uncovering of bleed holes 20 in partition 18. When the first bleed hole is uncovered, a complete loop is formed, and a slight flow is established. As thaw front 44 advances, more bleed holes 20 are uncovered and the rate of flow gradually increases until all the bleed holes 20 are uncovered. Therefore, the time rate of flow increases as a function of thaw progression. Adjustment parameters include the length 46 of thaw flow throttle 10 from front to back, and the size and spacing of bleed holes 20 in partition 18.

Figure 4:
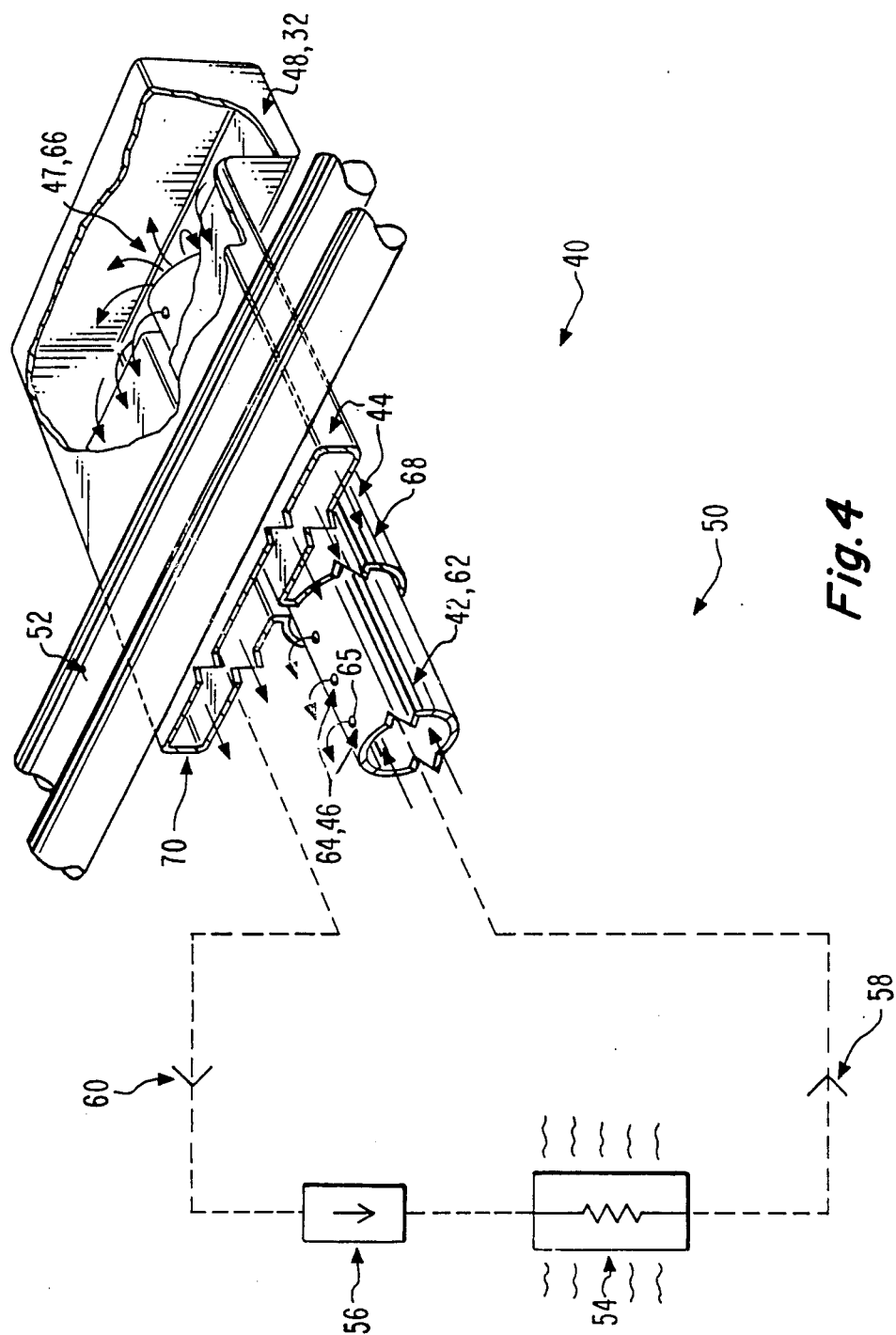
FIG. 4 is a perspective view of another embodiment of the present invention together with a simplified schematic diagram of the coolant system.

In FIG. 4, there is illustrated a typical embodiment of a self-thaw ducting arrangement 40 comprising an inner supply passage 42 and an outer supply passage 44. Inner supply passage 42 has a plurality of bleed holes 46 distributed along its entire length and an open end 47. Outer return passage 44 completely encloses inner supply passage 42 creating a return plenum 48. Bleed holes 46 and return plenum 48 allow fluid flow from inner supply passage 42 to outer return passage 44.

Ducting arrangement 40 is shown in FIG. 4 as a passive element in a force-fluid, liquid-metal coolant system 50 designed for space applications and comprising self-thaw ducting arrangement 40, a heat radiator panel 52, a heat source 54, a pump 56, a supply flow duct 58, a return flow duct 60, and associated tubing (not shown). Ducting arrangement 40 is located at the end of coolant system 50 remote enough from heat source 54 to insure that it is the last portion of coolant system 50 to be thawed but is sufficiently close to heat source 54 to enable the thaw front to reach the first bleed hole 65 by conduction. As large an area as possible of outer supply passage 44 is bonded with good thermal conductivity to radiator panel 52 to facilitate conductive heat transfer from ducting arrangement 40 to radiator panel 52. Radiator panel 52 radiates waste heat produced by heat source 24 to space. This radiator panel 52 in a preferred embodiment comprises a plurality of heat pipes so bonded to passage 44. Suitable materials for ducting arrangement 40 include titanium, stainless steel and alloys of niobium.

Cooling of heat source 54, is accomplished by circulating the coolant by means of pump 26. The supply flow 28 is carried by tubing (not shown) to inner supply passage 42. As coolant flows through inner supply passage 42, twenty-five to thirty percent of the flow is diverted by bleed holes 46 to return supply passage 44. The remaining seventy to seventy-five percent of the coolant reaches return plenum 48. Return plenum 48 reverses the flow into outer return passage 44. As coolant flows through outer return passage 44, the waste heat is transferred by conduction to radiator panel 52 (made up of heat pipes) where it is radiated into space. Return flow 60 is carried by tubing (not shown) back to pump 26 and the process repeats.

In the preferred embodiment shown in FIG. 4, inner supply passage 42 is a first circular tube 62 having a plurality of bleed holes 64 spaced along a singe line element on the surface of inner supply passage 42 which line element is parallel to the axis of inner supply passage 42. Outer supply passage 44 consists of a second circular tube 68 and a rectangular channel 70. Second circular tube 68 completely encloses first circular tube 62 except for a narrow region above bleed holes 64. The space between first circular tube 62 and second circular tube 68 is kept to a minimum. Therefore, during normal operation of the coolant system, the majority of return flow 60 returns through rectangular channel 70 with only a negligible return flow through the annular space between second circular tube 68 and first circular tube 62. Thermal shunting between supply flow duct 58 and return flow duct 60 is minimized to reduce performance penalties. This is accomplished by minimizing the conduction area between the supply and return passages. Specifically, the narrow neck 80 which joins second circular tube 68 to rectangular channel 70 is designed to minimize the conduction area. Furthermore, this neck is though to result in a relatively stagnant layer of coolant around first circular tube 62. This layer tends to serve as thermal insulation for supply flow 58 to increase the portion of the hottest coolant that reaches the farthest region of radiator 52 and improve radiator performance.

Rectangular channel 70 has one side bonded to radiator panel 52 (heat pipes) for heat transfer and the opposite side interconnected to second circular tube 68 directly above bleed holes 34 forming a narrow channel for fluid flow between first circular tube 62, second circular tube 68 and rectangular channel 70. Furthermore, rectangular channel 70 and second circular tube 68 are slightly longer than first circular tube 62 creating return plenum 72 to reverse fluid flow at the end of ducting arrangement 40.

Thawing of the metal coolant is accomplished in the following manner. Assume that heat source 54 and coolant system 50 have been inactive for an extended period of time allowing the metal coolant to freeze. This is the case of original startup after a spacecraft first achieves orbit. Spacecraft startup begins by raising the temperature of heat source 54 several hundred degrees Centigrade above the melting temperature of the coolant. (The melting temperature for lithium is 180° C.). The heat source 54 may be from the space reactor and startup may begin using thaw assists heat pipes. The frozen coolant in coolant system 50 closest to heat source 54 begins to melt establishing a thaw front, the boundary between the solid and liquid states of the coolant. Because heat is transferred initially only by conduction through the metal coolant, the thaw front will proceed a limited distance away from heat source 54 as established by the coolant conduction properties. Ducting arrangement 40 is positioned sufficiently close to heat source 54 to enable the thaw front to reach the first bleed hole 65 in inner supply passage 42 by conduction. Once the thaw front progresses past the first bleed hole 65, a slight circulation is established by pump 56 which transport the hot molten coolant from heat source 54 to the thaw front region in ducting arrangement 40. The convective heat transfer associated with the circulation of hot molten coolant will cause the thaw front to proceed along the duct as more and more thawed holes permit increased circulation of coolant. In this way, the thaw front will proceed the entire duct length as long as the source heat exceeds the heat rejection level.

In spite of the overall non-circular shape of outer return passage 44 described in the preferred embodiment, the notion of concentric tubes is maintained throughout ducting arrangement 40. This simplifies the design of flexible duct sections required for stowage before radiator panel deployment.

Referring to FIG. 5, two ducting arrangements 80a and 80b like those in FIG. 4 are connected in series by flexible duct section 90 which comprises a flexible, generally circular inner bellows 92 having a plurality of bleed holes 94 along its entire length and a flexible, generally circular outer bellows 96 completely enclosing inner bellows 92. Inner bellows 92 connects two series sections of inner supply passage 42, and outer bellows 96 connects two series sections of outer supply passage 44. The bleed holes 94 permit the thawing process, as described previously, to operate even when flexible duct sections are included in the ducting arrangement. The dotted image in FIG. 5 illustrates the bending of flexible duct section 90 so arrangement 80b is above arrangement 80a. This may be done for storage before deployment in space.

Having described the preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the liquid need not be liquid metal but may be of any suitable coolant normally a solid until heated. The panel may be circulating tubes rather than heat pipes, or may simply be a conductive plate.

I claim:

1. In a liquid-metal heat transport loop including a pump and a source of heat, the improvement comprising:

a heat exchanger with separate forward and reverse flow sections and a source of thaw heat for thawing a coolant that may be frozen in a non-operating state and melted in an operating state, a thaw flow throttle mounted between said forward and reverse flow sections of said heat exchanger, said thaw flow throttle having a partition separating forward and reverse flow sections thereof, said partition having a plurality of bleed holes to enable fluid flow of coolant between said forward and reverse flow sections when the coolant is melted.

2. The invention as claimed in claim 1 wherein said thaw flow throttle includes thermal insulation affixed to its outer surface to prevent heat radiated from said source of thaw heat and from said heat exchanges from prematurely thawing the coolant in said thaw flow throttle.

3. The invention as claimed in claim 1 wherein said bleed holes are in line extending away from the source of thaw heat.

4. The invention as claim in claim 1 wherein said thaw flow throttle is situated in relation to said source of thaw heat so as to be substantially the last section of said heat transport loop to be thawed.

5. In a liquid-metal coolant system for delivering heat from a heat source to a heat radiator, a ducting apparatus comprising:

an inner passage having a plurality of bleed holes along its length and a large opening at the end farthest from said heat source; and an outer passage, said outer passage enclosing said inner passage and being slightly longer than said inner passage for creating a plenum for fluid flow between said inner passage and said outer passage;

said ducting apparatus being located in relation to said heat source to cause said melt a coolant to melt by heat conduction at least to the first bleed hole in said inner passage, said bleed hole thaw initiating a circulating flow of melted metal coolant at least through said first bleed hole, said circulating flow of metal coolant at least through said first bleed hole progressively thawing metal coolant near additional bleed holes more remote from said heat source, thereby thawing said liquid-metal coolant system by circulating coolant heat transfer.

6. The invention as defined in claim 5 wherein said inner passage is a first generally circular tube having a plurality of bleed holes spaced along a line in said first circular tube, and wherein said outer passage comprises:

a second generally circular tube arranged substantially concentrically around said first circular tube; and a rectangular channel having one side in thermal contact with said heat radiator, the opposite side of said rectangular channel having a narrow interconnection with said second circular tube to allow fluid flow between said second circular tube and said rectangular channel.

7. The invention as defined in claim 6 wherein said narrow interconnection is proximate to said line of bleed holes.

8. The invention as defined in claim 5 including flexible duct sections, comprising:
(a) a flexible, circular inner bellows having a plurality of bleed holes and forming a connective link between two sections of said inner passage; and
(b) a flexible, circular outer bellows forming a connective link between two sections of said outer passage and enclosing said inner bellows; said flexible duct sections facilitating stowage of said ducting arrangement before deployment.

9. The invention as claimed in claim 5 wherein said inner passage contains coolant flowing away from said heat source and said outer passage contains coolant flowing towards said heat source.

10. In a liquid-metal coolant system for delivering heat from a heat source to a heat radiator, the combination comprising:
first and second ducting apparatus each comprising:
an inner passage having a plurality of bleed holes along its length and a large opening at the end farthest from said heat source; and
an outer passage, said outer passage enclosing said inner passage and being slightly longer than said inner passage for creating a plenum for fluid flow between said inner passage and said outer passage;
said first ducting apparatus being located in relation to said heat source to cause said metal coolant to melt by heat conduction at least to the first bleed hole in said inner passage, at least said first bleed hole permitting an initial circulating flow of metal coolant, the circulating flow of metal coolant through said bleed holes progressively thawing said liquid-metal coolant system by circulating coolant heat transfer; and further comprising:
a flexible inner bellows having a plurality of bleed holes and forming a connective link between said inner passage of said first ducting apparatus and that of said second ducting apparatus; and
a flexible outer bellows forming a connective link between said outer passage of said first ducting apparatus and that of said second ducting apparatus, and enclosing said inner bellows;
said flexible bellow sections facilitating stowage and deployment of said ducting arrangement.

11. The invention as defined in claim 10 wherein said inner passage is a first circular tube having a plurality of bleed holes spaced along a single line in said first circular tube, and wherein said outer passage comprises:
a second circular tube arranged substantially concentrically around said first circular tube; and a rectangular channel having one side in thermal contact with said heat radiator; the opposite side of said rectangular channel having a narrow interconnection with said second circular tube to allow fluid flow between said first circular tube, said second circular tube, and said rectangular channel.

12. The invention as claimed in claim 10 wherein said inner and outer bellows are circular.

13. The invention as claimed in claim 10 wherein said inner passage contains coolant flowing away from said heat source and said outer passage contains coolant flowing towards said heat source.

14. In a heat transport loop having a supply duct and a return duct and containing a coolant that may be frozen in a nonoperating state and melted in an operating state, and having a source of thaw heat for thawing said coolant, a thaw flow control comprising:
a fluid passage having forward and reverse flow sections respectively coupled to said supply duct and said return duct;
a partition separating said forward and reverse flow sections, said partition having a plurality of bleed holes therein to enable fluid flow of coolant between said forward and reverse flow sections when the coolant is melted.

15. The invention as claimed in claim 14 wherein said thaw flow control is situated in relation to said source of thaw heat so as to be substantially the last section of said heat transport loop to be thawed.

16. The invention as claimed in claim 14 wherein said thaw flow control includes thermal insulation affixed to the outer surface to prevent heat radiated from said source of thaw heat from prematurely thawing the coolant in said thaw flow control.

* * * * *